No. 686,571. Patented Nov. 12, 1901.
A. N. WILSON.
PIPE COUPLING.
(Application filed Dec. 17, 1900.)
(No Model.)
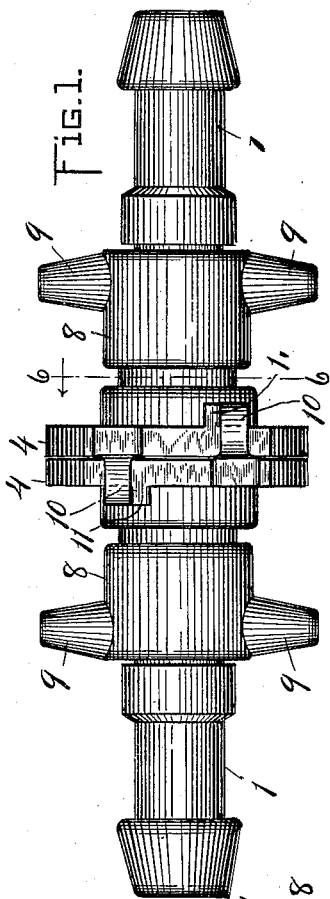
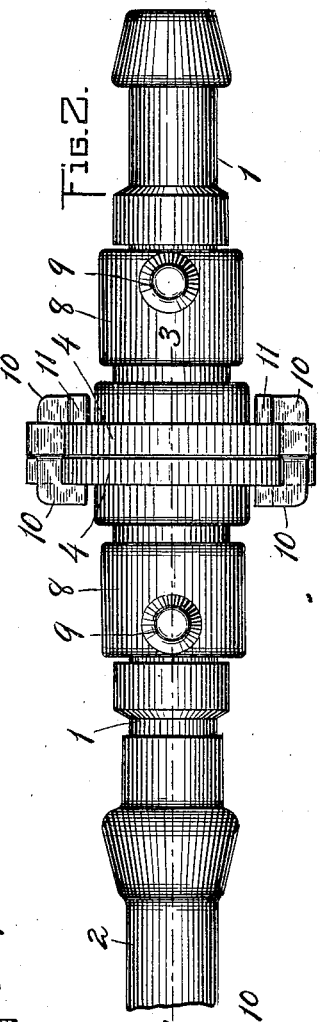
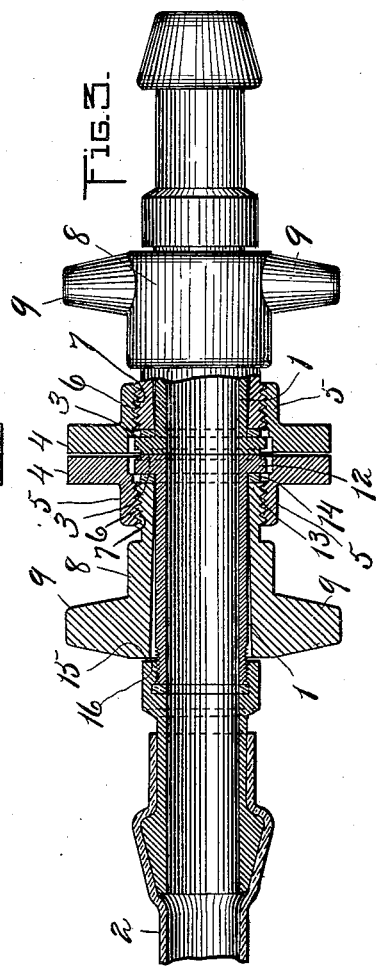
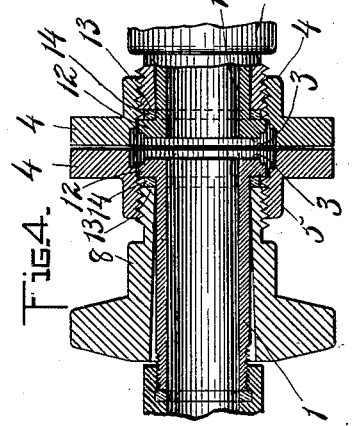
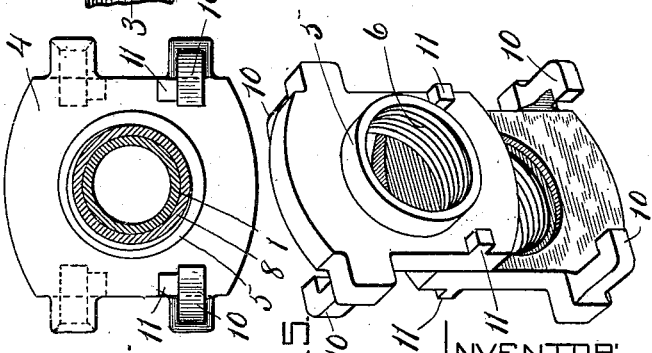
WITNESSES: INVENTOR:
Fred E. Dorr. Arthur N. Wilson
Walter P. Abell. by Wright, Brown & Quinby
Attys.

UNITED STATES PATENT OFFICE.

ARTHUR N. WILSON, OF SALEM, MASSACHUSETTS.

PIPE-COUPLING.

SPECIFICATION forming part of Letters Patent No. 686,571, dated November 12, 1901.

Application filed December 17, 1900. Serial No. 40,093. (No model.)

*To all whom it may concern:*

Be it known that I, ARTHUR N. WILSON, of Salem, in the county of Essex and State of Massachusetts, have invented certain new and useful Improvements in Pipe-Couplings, of which the following is a specification.

This invention has for its object to provide an improved coupling for conduits; and it consists in certain novel features of construction and arrangement which I shall now proceed to describe and claim.

Of the accompanying drawings, forming a part of this specification, Figure 1 represents a side elevation of a coupling constructed in accordance with my invention. Fig. 2 represents a plan view thereof. Fig. 3 represents a vertical longitudinal section, partly in elevation, showing the complemental seats on the conduit members locked together. Fig. 4 represents a detail section showing said seats separated. Fig. 5 represents a perspective view showing the manner of interlocking and separating the coupling elements. Fig. 6 represents a section on line 6 6 of Fig. 1.

The same reference characters indicate the same parts in all of the figures.

Referring to the drawings, 1 1 represent conduit members adapted to form parts of a conduit, such as a train-pipe, hose, or the like, a portion of the body of said conduit being shown at 2 in Figs. 2 and 3. The ends of the conduit members or sections 1 1 are provided with annular ground faces 3 3, constituting complemental seats, which are adapted to fit together to form a fluid-tight joint.

The end of each conduit member is provided with a coupling element or plate 4, movable longitudinally of said member and having a hub or flange 5, formed with an internal screw-thread 6, engaged by a complemental external thread 7 on the end of a sleeve 8, which is mounted to rotate loosely on the conduit member 1, said sleeve having projections or bosses 9 9, adapted to form a convenient hold for the hand in rotating the sleeve. Each of the plates 4 4 is provided near one end with a pair of hooks 10 10, adapted to take over the edge of the opposite plate and interlock the plates, so as to prevent their longitudinal separation. The plates 4 4 are engaged with or separated from each other by a lateral sliding movement, in which the plates move parallel to each other, as indicated in Fig. 5. Their engaging movement is limited by means of lugs or projections 11 11 on each plate, adapted to engage the hooks 10 on the opposite plate, the proper relative position of the two members of the coupling being thereby determined. It will be seen from the drawings that the positions of the complemental interlocking members of the respective plates are such that when the plates are interlocked their relative rotation is prevented. By reason of the screw engagement of the sleeves 8 and plates 4 the latter can be moved longitudinally with respect to the conduit members 1 by rotating the sleeves 8, the positions of the seats 3 with respect to the abutting faces of the plates 4 being thereby varied.

The conduit members 1 are provided with flanges 12 12 on their ends, and the plates 4 are recessed to receive said flanges, the flanges being capable of being withdrawn wholly within the recesses, as shown in Fig. 4, or projected, as shown in Fig. 3. The rear faces of the flanges 12 constitute shoulders or abutments, which coöperate with the end faces 13 of the sleeves, renewable washers 14 being interposed between said sleeves and flanges.

In operating the coupling the plates 4 4 are interlocked by a lateral movement, as described, when the seats 3 3 are retracted within the recesses in the plates, as shown in Fig. 4. Then by turning the two sleeves 8 8 in opposite directions, their threads being pitched in the same direction, the seats 3 3 will be forced toward each other by a coaction of the ends 13 of the sleeves with the flanges 12 until finally the said seats meet and become firmly pressed together, as shown in Fig. 3. The plates 4 act as one member, their longitudinal separation being prevented by the hooks 10. To unfasten the coupling, the sleeves 8 are rotated in a reverse direction, and the abutting seats 3 3 are retracted by the coaction of the rear end 15 of each of the sleeves 8 with a shoulder 16 on each of the conduit members 1. The plates 4 4 may then be slid apart to separate the members of the coupling.

My improved coupling enables the parts of a conduit to be connected and disconnected with great facility and secures a tight joint between the parts.

I do not confine myself to the exact construction herein set forth, as considerable variation may be made without departing from the spirit of my invention.

I claim—

1. In a conduit-coupling, the combination of the two conduit members having complemental seats, coupling elements on the ends of said members having interlocking means adapted to be engaged and disengaged by a relative lateral movement of the conduit members, and provisions for preventing the relative rotation of the coupling elements when interlocked, one of said coupling elements being movable longitudinally of its conduit member, and a sleeve rotatably surrounding and engaged with said conduit member and having a threaded engagement with the movable element, said sleeve being adapted, when rotated, to force the complemental seats together.

2. In a conduit-coupling, the combination of the two conduit members having complemental seats and complemental coupling-plates, the latter each provided with fixed coupling means adapted to engage the opposite plate to lock the plates against longitudinal separation, one of said plates being movable longitudinally of its conduit member, and a sleeve rotatably surrounding and engaged with said conduit member and having a threaded engagement with the movable plate, said sleeve being adapted, when rotated, to force the complemental seats together.

3. In a conduit-coupling, the combination of the two conduit members having complemental seats, complemental coupling members movable longitudinally of the conduit members, provisions for locking said coupling members together to prevent their longitudinal separation, and sleeves rotatably mounted on the respective conduit members and having threaded engagement with the coupling members, said sleeves being rotatable in opposite directions to force the complemental seats together.

In testimony whereof I have affixed my signature in presence of two witnesses.

ARTHUR N. WILSON.

Witnesses:
A. D. HARRISON,
R. M. PIERSON.